United States Patent
Fowers

(10) Patent No.: US 10,594,917 B2
(45) Date of Patent: Mar. 17, 2020

(54) NETWORK-CONTROLLED 3D VIDEO CAPTURE

(71) Applicant: Microsoft Technology Licensing, LLC, Redmond, WA (US)

(72) Inventor: Spencer G Fowers, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 15/797,909

(22) Filed: Oct. 30, 2017

(65) Prior Publication Data
US 2019/0132504 A1    May 2, 2019

(51) Int. Cl.
| | |
|---|---|
| H04N 5/232 | (2006.01) |
| H04L 12/26 | (2006.01) |
| H04N 21/4223 | (2011.01) |
| H04N 21/218 | (2011.01) |
| H04N 13/161 | (2018.01) |

(Continued)

(52) U.S. Cl.
CPC ..... H04N 5/23206 (2013.01); H04L 43/0811 (2013.01); H04N 5/247 (2013.01); H04N 7/181 (2013.01); H04N 13/161 (2018.05); H04N 13/194 (2018.05); H04N 13/243 (2018.05); H04N 13/271 (2018.05); H04N 13/275 (2018.05); H04N 13/282 (2018.05); H04N 13/344 (2018.05); H04N 21/21805 (2013.01);

(Continued)

(58) Field of Classification Search
CPC ............. H04N 5/23206; H04N 13/161; H04N 13/194; H04N 13/282; H04N 21/21805; H04N 21/4223; H04L 43/0811
See application file for complete search history.

(56) References Cited

U.S. PATENT DOCUMENTS

| | | |
|---|---|---|
| 7,483,939 B2 | 1/2009 | Mussack et al. |
| 8,587,583 B2 | 11/2013 | Newcombe et al. |

(Continued)

FOREIGN PATENT DOCUMENTS

EP    3079346 A2    10/2016

OTHER PUBLICATIONS

Alexander et al. "Processing of Mars Exploration Rover imagery for science and operations planning", J. Geophysical Research, vol. 111, EO2S02, doi: 10.1029/2005JE002462, 2006 (Year: 2006).*

(Continued)

*Primary Examiner* — Richard A Hansell, Jr.
(74) *Attorney, Agent, or Firm* — Klarquist Sparkman, LLP

(57) ABSTRACT

Techniques are described for controlling the process of capturing three-dimensional (3D) video content. For example a controller can provide centralized control over the various components that participate in the capture, and processing, of the 3D video content. For example, the controller can establish connections with a number of components (e.g., running on other computing devices). The controller can receive state update messages from the components (e.g., comprising state change information, network address information, etc.). The controller can also broadcast messages to the components. For example, the controller can broadcast system state messages to the components where the system state messages comprise current state information of the components. The controller can also broadcast other types of messages, such as start messages that instruct the components to enter a start state.

18 Claims, 10 Drawing Sheets

(51) Int. Cl.
  *H04N 13/194*  (2018.01)
  *H04N 13/282*  (2018.01)
  *H04N 13/243*  (2018.01)
  *H04N 7/18*    (2006.01)
  *H04N 13/275*  (2018.01)
  *H04N 5/247*   (2006.01)
  *H04N 13/344*  (2018.01)
  *H04N 13/271*  (2018.01)
  *G02B 27/01*   (2006.01)
  *G03B 37/04*   (2006.01)

(52) U.S. Cl.
  CPC . *H04N 21/4223* (2013.01); *G02B 2027/0174* (2013.01); *G03B 37/04* (2013.01)

(56) References Cited

U.S. PATENT DOCUMENTS

| | | | |
|---|---|---|---|
| 9,001,226 | B1 | 4/2015 | Ng et al. |
| 9,324,190 | B2 | 4/2016 | Bell et al. |
| 9,345,957 | B2* | 5/2016 | Geisner ............ G06F 3/012 |
| 9,443,350 | B2 | 9/2016 | Wagner et al. |
| 9,486,924 | B2* | 11/2016 | Dubrovsky ........ G05B 19/409 |
| 9,727,970 | B2 | 8/2017 | Song et al. |
| 10,091,015 | B2* | 10/2018 | Kennedy .......... H04L 12/2814 |
| 2004/0017937 | A1* | 1/2004 | Silverstein .......... B25J 9/1697 |
| | | | 382/153 |
| 2004/0240981 | A1* | 12/2004 | Dothan ............ B65G 49/067 |
| | | | 414/795.4 |
| 2008/0025387 | A1* | 1/2008 | Lim .................. H04N 7/185 |
| | | | 375/240.01 |
| 2010/0110068 | A1 | 5/2010 | Yamauchi et al. |
| 2011/0029931 | A1* | 2/2011 | Liu .................. H04L 41/00 |
| | | | 715/849 |
| 2011/0054684 | A1* | 3/2011 | Seo ................ G05B 19/0421 |
| | | | 700/248 |
| 2013/0021486 | A1 | 1/2013 | Richardson |
| 2013/0073619 | A1* | 3/2013 | Tumuluri ............ G06T 19/20 |
| | | | 709/204 |
| 2014/0285685 | A1* | 9/2014 | Theuwissen ...... H04N 5/23212 |
| | | | 348/229.1 |
| 2015/0346812 | A1* | 12/2015 | Cole ................ H04N 19/597 |
| | | | 345/156 |
| 2016/0088287 | A1* | 3/2016 | Sadi ................. G03B 35/08 |
| | | | 348/43 |
| 2016/0105618 | A1 | 4/2016 | Shimauchi |
| 2017/0053447 | A1 | 2/2017 | Chen et al. |
| 2017/0076429 | A1* | 3/2017 | Russell ............. G06T 3/4038 |
| 2017/0091996 | A1 | 3/2017 | Wei et al. |
| 2017/0280130 | A1* | 9/2017 | Burton .............. G06T 7/97 |

OTHER PUBLICATIONS

"New update releases for ContextCapture and ContextCapture Editor are now available", Retrieved from <<https://www.acute3d.com/contextcapture-connect-edition-update-6/>>, Aug. 21, 2017, 4 Pages.

Cutler, et al., "Holoportation", Retrieved from <<https://www.microsoft.com/en-us/research/project/holoportation-3/>>, Mar. 25, 2016, 5 Pages.

"International Search Report & Written Opinion Issued in PCT Application No. PCT/US18/056816", dated Jan. 28, 2019, 16 Pages.

* cited by examiner

NETWORK-CONTROLLED 3D VIDEO CAPTURE

BACKGROUND

Controlling a number of devices that are involved with processing information can be a difficult task. For example, if a number of devices are involved with processing video information (e.g., video capture and processing), the devices may need to be started in a specific order and/or the devices may need to being processing video information in a specific order or with a specific configuration. The order that the devices start up and begin processing can be even more important in situations where the devices are located remotely from one another and communicate via a computer network.

In some solutions, such devices can be started manually. For example, a user could physically power on one of the devices, log in, and start a specific software application. The user could repeat this process for the other devices in a specific order and using specific configuration options. However, this procedure can be problematic and error prone. For example, the user may need to start software on a first device, switch to a second device to start a different software application, switch back to the first device to establish a network connection to the second device, and so on. Problems can also occur if one of the devices fails (e.g., due to a software crash), which can cause the entire system to fail.

Therefore, there exists ample opportunity for improvement in technologies related to network-controlled video capture and processing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for controlling the process of capturing three-dimensional (3D) video content. For example a controller can provide centralized control over the various components that participate in the capture, and processing, of the 3D video content. For example, the controller can establish connections with a number of components (e.g., running on other computing devices). The controller can receive state update messages from the components (e.g., comprising state change information, network address information, etc.). The controller can also broadcast messages to the components. For example, the controller can broadcast system state messages to the components where the system state messages comprise current state information of the components. The controller can also broadcast other types of messages, such as start messages that instruct the components to enter a start state.

For example, a method can be provided for controlling 3D video capture. The method comprises receiving connections from a plurality of components, where the plurality of components run on one or more other computing devices. The plurality of components can process information for generating a three-dimensional holographic video output from a captured real-world video input. The method also comprises receiving state update messages from the plurality of components, where the state update messages comprise indications that the plurality of components are in a ready state. The method also comprises, after receiving the state update messages from the plurality of components, broadcasting a start command to the plurality of components. The plurality of components start processing information for generating the three-dimensional holographic video output from the captured real-world video input based, at least in part, on the start command received from the computing device. The plurality of components can comprise a plurality of depth generators, an encoder, and a distributor.

In some implementations, the method comprises broadcasting system state messages to the plurality of components. For example, the system state messages can comprise current state information for the plurality of components. The system state messages can be broadcast in response to state changes among the plurality of components. In some implementations, the method is performed by a controller running on a computing device that communicates with the plurality of components via a network connection to a computer network.

As described herein, a variety of other features and advantages can be incorporated into the technologies as desired.

DETAILED DESCRIPTION

Overview

Figure 1:
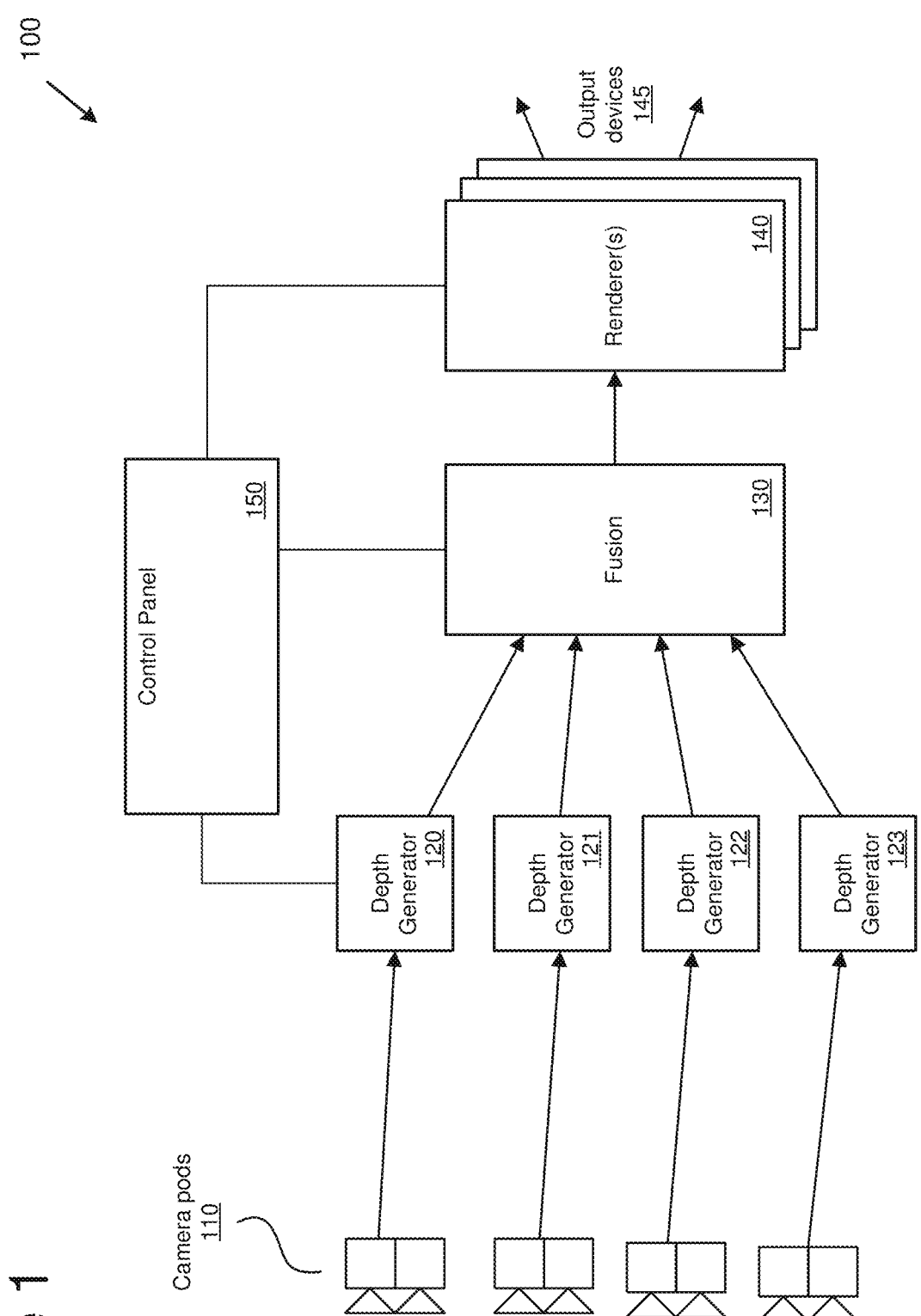
FIG. 1 is a diagram depicting an example environment for controlling three-dimensional video capture by a control panel.

As described herein, various technologies are provided for controlling the process of capturing three-dimensional (3D) video content. For example a controller (also called a control panel) can provide centralized control over the various components that participate in the capture, and processing, of the 3D video content. For example, the controller can establish connections with a number of components (e.g., running on other computing devices). The controller can receive state update messages from the components (e.g., comprising state change information, network address information, etc.). The controller can also broadcast messages to the components. For example, the controller can broadcast system state messages to the components where the system state messages comprise current state information for the components. The controller can also broadcast other types of messages, such as start messages that instruct the components to enter a start state.

The technologies described herein can be used to control the process of capturing real-world video input that is used to generate a 3D holographic video output. In order to provide the real-world video input, video cameras are used to capture images of real-world objects or environments (e.g., people or things). The video cameras capture images that are used to generate depth information in addition to images that are used to apply color. In some implementations, the video cameras are organized into groups (also called pods) of two monochrome cameras and one color camera. For example, the monochrome cameras can use infrared (IR) bandpass filters and an IR speckle pattern to improve stereo correspondence matching. The video output (e.g., depth video streams and color video streams) can be transferred to other components that process the video information, generate the 3D models, and display the 3D holographic video output. For example, the video output can be transmitted over a network to depth generators (e.g., running on different computing devices) that create depth maps from the monochrome images. The depth maps can then be transmitted over a network to a fusion component (e.g., running on a different computing device from the depth generators) that combines the depth maps and creates a 3D model. The 3D model can then be transmitted over a network to a renderer (e.g., running on a different computing device from the fusion component) that receives the 3D model and renders it into a viewable format and applies the color information (e.g., that was passed, from the color cameras, along the same path) to create a color 3D model that is then ready for output to a holographic display device, or to another type of display device. For example, the renderer can generate left and right 1080p images to display the 3D holographic video output in a virtual reality or augmented reality headset. Some examples of holographic display devices that can be utilized as output devices include the Microsoft® HoloLens® and the HTC VIVE™.

The technologies described herein can be used to implement a holoportation system. Holoportation is a type of 3D capture technology that allows high quality 3D models of people and/or environments to be constructed and transmitted to a viewer in real-time. In some implementations, the 3D models are transmitted to remote locations for viewing. Holoportation allows users to see and interact with remote participants in 3D as if they are actually present in their physical space.

Some solutions exist for capturing and presenting 3D video content. However, such solutions face a number of problems. For example, existing solutions utilize a large number of computing devices that are poorly interconnected. For example, certain devices in the system may need to connect to other devices in the system. If such interconnections are established manually, then errors can occur (e.g., devices can be configured incorrectly). In addition, existing solutions use manual startup procedures. For example, the devices used in the capture, processing, and display of the 3D video content may have to be started manually and in a specific order. Such manual startup can be problematic. For example, if certain devices are not started in the correct order, or are not given enough time to initialize, they may fail to operate correctly (e.g., they may produce corrupted data, they may produce no data at all, or they may crash).

Using the technologies described herein, 3D video content can be captured and processed more efficiently and reliably. For example, a controller can be utilized to control the startup and operation of the various components (which may be running on a number of computing devices spread out through local and/or remote networks) that participate in the capture, processing, and display of 3D video content. The controller can control the startup and initialization procedure by receiving connections from the various components in order to ensure that the components are in a ready state before proceeding. The controller can also control the startup procedure where the components begin processing the video input to generate the 3D content by controlling the transition of the various components into a running state (e.g., controlling the order that the various components enter the running state and begin processing the content). The controller can also manage other activities of the components. In some implementations, the controller provides state management including receiving state information from the various components and broadcasting state updates to the components. For example, a given component may need to know that another component has entered the running state before it can transition to the running state and can therefore wait for the controller to broadcast a state update indicating that the other component has entered the running state before transitioning itself. The controller can also provide for the ability of the components to disconnect and reconnect (e.g., to automatically resume processing by coordinating with the other components when a component reconnects). The controller can also provide for ordered shutdown of the overall system (e.g., transmitting shutdown or stop commands to the components in a specific order). The controller can also provide for error recovery (e.g., reconfiguring or restarting components when processing errors are detected).

In some implementations, the components can be turned on in any order (e.g., the computing devices and/or software applications can be turned on manually or via an automated procedure). The components then automatically connect to the controller at a known network address of the controller (e.g., that is pre-configured). The components then receive broadcast messages (e.g., broadcast system state messages) from the controller and use the information in the broadcast messages to perform any needed direct network connections with other components. The components then wait for the controller to send out a start command Once the start command is sent by the controller, the components being processing in a particular order based on the state of the other components (as reported by broadcast messages from the controller). For example, the distributor will wait for a broadcast message reporting that the depth generators are running before the distributor begins running and processing video data.

3D Video Capture Environments

In the technologies described herein, environments can be provided to support 3D video capture in order to generate 3D models that can be rendered for display to users (e.g., using holographic display devices). For example, the environments can comprise computing devices running the various components in a local environment or in remote environments.

FIG. 1 is a diagram depicting an example environment 100 for controlling three-dimensional video capture by a control panel 150 (which is also called a controller or control panel component). The example environment 100 includes a number of camera pods 110. For example, each of the camera pods 110 can include two monochrome video cameras and one color video cameras. In the example environment 100, there are eight camera pods 110 depicted. However, more or fewer camera pods can be utilized. In some implementations, a minimum of two camera pods are used to provide enough depth information to generate a 3D image, but more camera pods can, in some situations, improve the quality of the generated 3D image.

In the example environment 100, there are four depth generators (also called depth generator components), 120 through 123. Each depth generator receives video information from two camera pods (e.g., via a wired connection such as a USB cable, via a wireless connection, or via a network connection). For example, depth generator 120 receives video information from the top two camera pods. In this arrangement, the depth generator 120 generates two live depth maps from two distinct viewpoints. The remaining depth generators 121, 122, and 123 each receive video information from their respective group of two video pods and generate their respective live depth maps. In general, the depth generators can send messages (e.g., connection messages) to the control panel 150 informing the control panel 150 the number of depth generators that are present. This information can be included by the control panel 150 in broadcast system state messages to inform other components that may need to know the number of depth generators.

A depth generator refers to the software and/or hardware that receives and processes the video input from one or more cameras. In general, a depth generator performs some or all of the following operations: receiving video images from one or more video cameras (e.g., comprising monochrome and/or color images), generating depth maps from the received video images (e.g., from the monochrome images), and transmitting the depth maps and/or color images to the distributor. In some implementations, each depth generator is a software application that runs on a different computing device. For example, each depth generator, 120 through 123, can run on its own computer, with each computer having two graphics cards each processing video data for one video pod. However, depth generators can run on more or fewer computing devices, or on virtual machines (e.g., using cloud computing resources).

In the example environment 100, there is one fusion component 130. The fusion component 130 performs fusion of the depth maps received from the depth generators 120-123 to generate a 3D model (also called a 3D mesh or 3D volumetric mesh). The fusion component 130 can receive information (e.g., in broadcast system state messages from the control panel 150) indicating the number of depth generators, which can allow the fusion component 130 to combine the depth maps correctly. In some implementations, the fusion component 130 runs as software on a separate computing device or separate virtual machine. In general, a fusion component performs some or all of the following operations: receiving depth maps from the depth generators, receiving color images from the depth generators, generating 3D models from the depth maps, and transmitting the 3D models and color images to the renderers.

In the example environment 100, there are one or more renderers 140 (also called renderer components). The renderers 140 receive the 3D model from the fusion component 130 and render it into a viewable format and apply the color information (e.g., red-green-blue (RGB) texture map) that was captured from the color cameras of the camera pods 110 (e.g., creating a color 3D model). The 3D output is provided to output devices 145 for display. For example, each of the renderers 140 can produce 3D output for a specific output device (e.g., a specific holographic display device or headset). A renderer can also produce output in a two-dimensional format (e.g., for display on a computer monitor or sending to a web site). In some implementations, the renderers 140 run as software on separate computing devices or separate virtual machines. In general, a renderer performs some or all of the following operations: receiving 3D models from the fusion component, receiving color images from the fusion component, applying color to the 3D models using the color images to create color 3D models, processing the color 3D models into an output video in a format compatible with a particular output device (e.g., two images for a virtual reality or augmented reality headset, a single video stream, etc.), and outputting the output video (e.g., sending to a connected headset, sending to a connected monitor, sending via a network, etc.). In some implementations, the renderers 140 report the number of renderers being used (e.g., in connection messages to the control panel 150). The control panel 150 can include this information in broadcast system state messages (e.g., allowing the fusion component 130 to directly connect to each of the renderers, which may be running on different computing devices).

The example environment 100 includes a control panel 150. The control panel 150 operates as software and/or hardware that is separate from the other components of the environment. For example, the control panel 150 can run as software on a separate computing device or virtual server.

The control panel 150 provides a point of central control for the overall environment. In order to provide this control, the control panel 150 is connected to the various components of the system via network connections. For example, the control panel 150 can be associated with a known network address (e.g., an Internet protocol (IP) address or host name) to which the various components connect (e.g., using a pre-configured IP address or host name).

In some implementations, the control panel 150 manages the state of the overall environment for controlling 3D video capture. In order to manage the state of the overall environment, the control panel 150 maintains state information for some or all of the components (e.g., maintains the state of each individual component). In some implementations, a given component can be in one of the following states: a ready state, a running state, and a stopped state. The ready state indicates that the component has connected to the control panel 150 (e.g., using the known network address of the control panel 150 to connect), has performed any needed configuration or initialization, and is ready to start operation. The running state indicates that the component is actively performing its processing tasks (e.g., for a depth generator the depth generator would be receiving video image data, generating depth maps, and transmitting the depth maps and color information to the distributor). The stopped state indicates that the component is not running (e.g., the component could be on but not yet in the ready state, or could be stopped and not processing due to a command from the control panel 150). In some implementations, an FPS (frames per second) state is also provided that indicates the speed at which a given component is processing.

In some implementations, the control panel 150 broadcasts the current state of the components to the components of the overall environment (e.g., to all of the components).

The broadcast system state message informs the various components of the state of each component of the overall environment and can be used to manage state transitions and other activity. In some implementations, the control panel 150 broadcasts a system state message (comprising the current state information of the components) whenever there has been a state change to one of the components (e.g., upon receiving a message from a component indicating that it has changed its state). The control panel 150 can also broadcast a system state message based on other activity (e.g., upon receiving a connection from one of the components). The broadcast system state messages can contain information other than the current state of the components, such as connection information (e.g., IP addresses or host names of the components), which can allow the components to establish direct network connections with one another.

In some implementations, the control panel 150 allows the various components to disconnect and reconnect. For example, if one of the components fails (e.g., crashes), then the component can reconnect to the control panel 150, reconnect to other components if needed, and resume processing operations.

By managing the various components of the overall environment, the control panel 150 can ensure that the overall environment starts, runs, and shuts down in an ordered manner. For example, the control panel 150 can enforce a startup order of the various components by maintaining the states of the various components and sending out broadcast system state messages. The components can use the broadcast system state messages to coordinate their state changes (e.g., ensuring that certain activities and/or state changes occur in relation to other components prior to changing state and/or performing actions themselves).

In some implementations, each component (e.g., each of the depth generators 120-123, the fusion component 130, each of the renderers 140, and the control panel 150) runs on a separate computing device (e.g., a separate physical computer or server, or a separate virtual machine). However, in some implementations, some of the components can run on the same computing device (e.g., the fusion component 130 and the renderers 140 could run on the same server) and/or run using cloud computing resources (e.g., as separate components that run using cloud computing resources).

In the example environment 100, the components can be located at the same location. For example, the components could all reside in a single room or in the same building (e.g., connected via a local area network). In some implementations, some or all of the components can be located in different locations (e.g., connected via wide area networks, such as the Internet).

Figure 2:
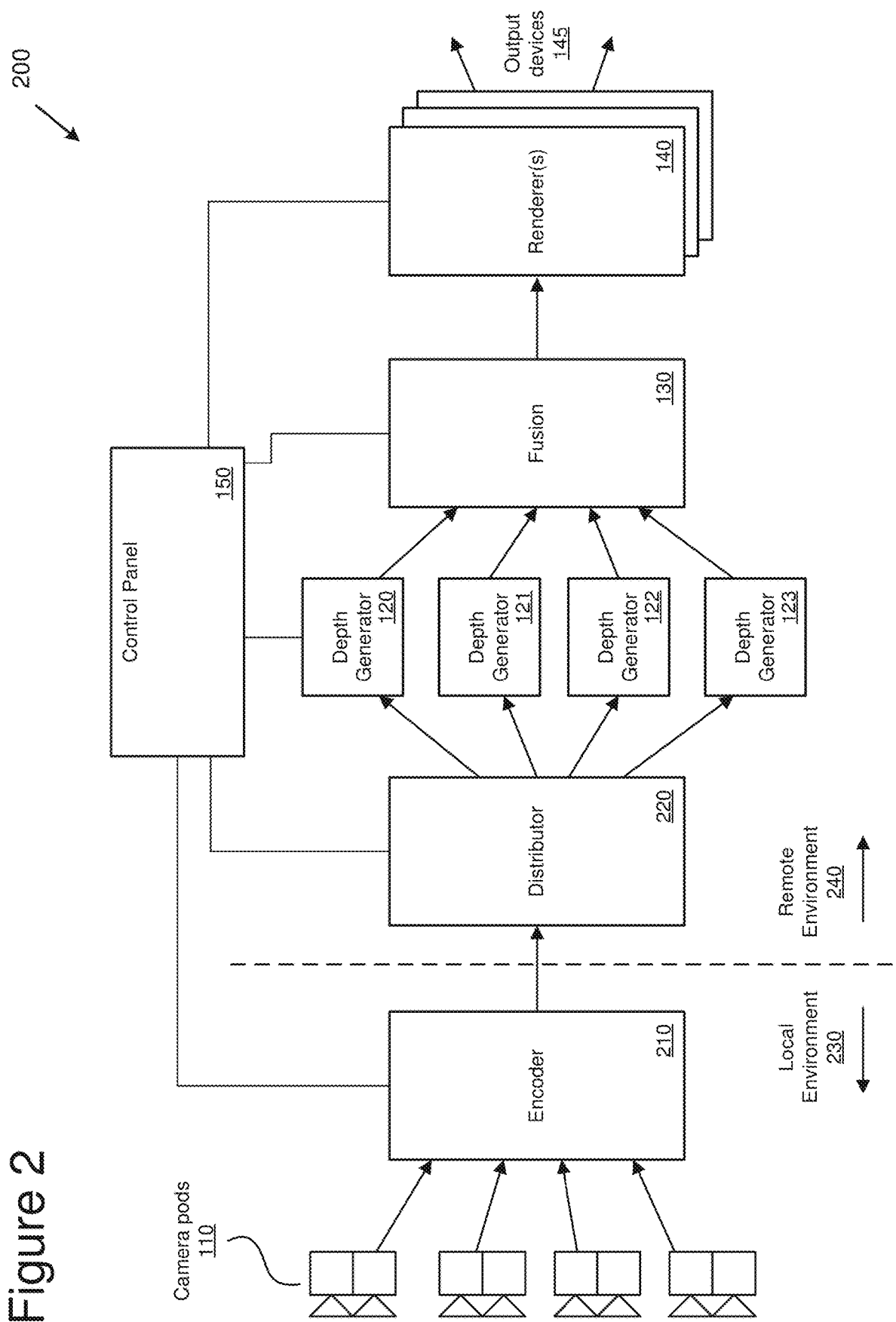
FIG. 2 is a diagram depicting an example environment for controlling three-dimensional video capture by a control panel, including encoder and distributor components.

FIG. 2 is a diagram depicting an example environment 200 for controlling three-dimensional video capture by a control panel 150. The example environment 200 contains the same components as the example environment 100, but with some additional components and a different arrangement. Specifically, the example environment 200 includes an encoder 210 and a distributor 220. The encoder component 210 receives the video images from the camera pods 110, encodes the video images (e.g., using a video codec), and transmits the encoded video images to the distributor 220. In some implementations, the encoder 210 can pack the video images (e.g., video images in a 1080p resolution, or some other resolution) into a larger image (e.g., an image in a 4K resolution, or some other larger resolution) and encode the larger image (e.g., using a video codec, such as H.264). The encoder 210 can combine the individual video images as they are received into the larger video image (e.g., on a picture-by-picture or frame-by-frame basis). For example, the encoder 210 can receive two monochrome pictures and one color picture from each of the eight camera pods 210, combine them (e.g., in a pre-defined tiled arrangement) into a larger picture, encode the larger picture, and transmit the encoded picture to the distributor 220.

The distributor 220 receives the encoded image from the encoder component 210, divides it up, and sends image data to the depth generators 120-123 for processing. For example, the distributor 220 can divide up the image data so that the image data for each group of two camera pods is transmitted to a corresponding depth generator. The distributor 220 can receive information (e.g., in broadcast system state messages from the control panel 150) indicating the number of depth generators, which can allow the distributor 220 to divide up the image data accordingly. The depth generators 120-123, fusion component 130, and renderer 140, then perform the same operations as discussed above in relation to FIG. 1.

In some implementations, the encoder 210 runs (e.g., as a software application) on a separate computing device or virtual machine from the other components of the environment. For example, the encoder 210 can comprise software and/or hardware resources separate from the other components. In general, a encoder performs some or all of the following operations: receiving video images from one or more video cameras (e.g., comprising monochrome and/or color images), encoding the video images (e.g., using a video codec, such as H.264) which can include packing the video images into larger video images in a particular arrangement, and transmitting the encoded video images to the distributor.

In some implementations, the distributor 220 runs (e.g., as a software application) on a separate computing device or virtual machine from the other components of the environment. For example, the distributor 220 can comprise software and/or hardware resources separate from the other components. In general, a distributor performs some or all of the following operations: receiving encoded video images from the encoder, decoding the video images, dividing the video images, and transmitting the video images to the depth generator components.

In some implementations, the camera pods and the encoder 210 operate in a local environment 230, while the other components (the distributor 220, depth generators 120-123, fusion component 130, renderer 140, and control panel 150) operate in a remote environment 240. The components of the local environment 230 communicate with the components of the remote environment 240 via one or more network connections (e.g., wired network connections, wireless network connections, or a combination). For example, the components of the local environment 230 could be located in a specific geographical location (e.g., a room in a building) while the components in the remote environment 240 could be located in a different geographical location (or multiple different geographical locations). For example, some of the components of the remote environment 240 could be server computers or virtual servers located in a remote data center. In some implementations, the local environment 230 is a mobile environment (e.g., an automobile) in which the camera pods 110 and the encoder 210 operate, and that communicates with the components of the remote environment 240 (e.g., with the distributor 220 and/or the control panel 150) using a wireless network connection (e.g., WiFi® connections and/or cellular data connections).

Using an encoder 210 and a distributor 220 can provide benefits when they are located remotely from one another. For example, the encoder 210 can encode the image data using compression (e.g., using H.264 or another video encoding and compression technology) so that it can be transmitted over a relatively low bandwidth network connection (e.g., a wireless network connection). This arrangement can allow the system to operate effectively in a mobile environment.

In some implementations, there are no depth generators. For example, the cameras (e.g., camera pods 110) can be depth cameras that internally generate depth maps. One example type of depth camera is the Microsoft® Kinect® camera. In this arrangement, the depth cameras connect directly to the fusion component 130 (e.g., in the arrangement depicted in FIG. 1) or to the encoder 210 (e.g., in the arrangement depicted in FIG. 2), and the depth generators (e.g., depth generators 120-123) are not present.

Controller Operation

In the technologies described herein, a controller (also called a control panel) manages operation of the components involved in capturing the 3D video content and generating the 3D models that can be rendered for display to users (e.g., using holographic display devices). The controller manages and coordinates the operation by sending and receiving messages. In some implementations, the controller enforces a state machine that controls the operation of the various components.

Figure 3:
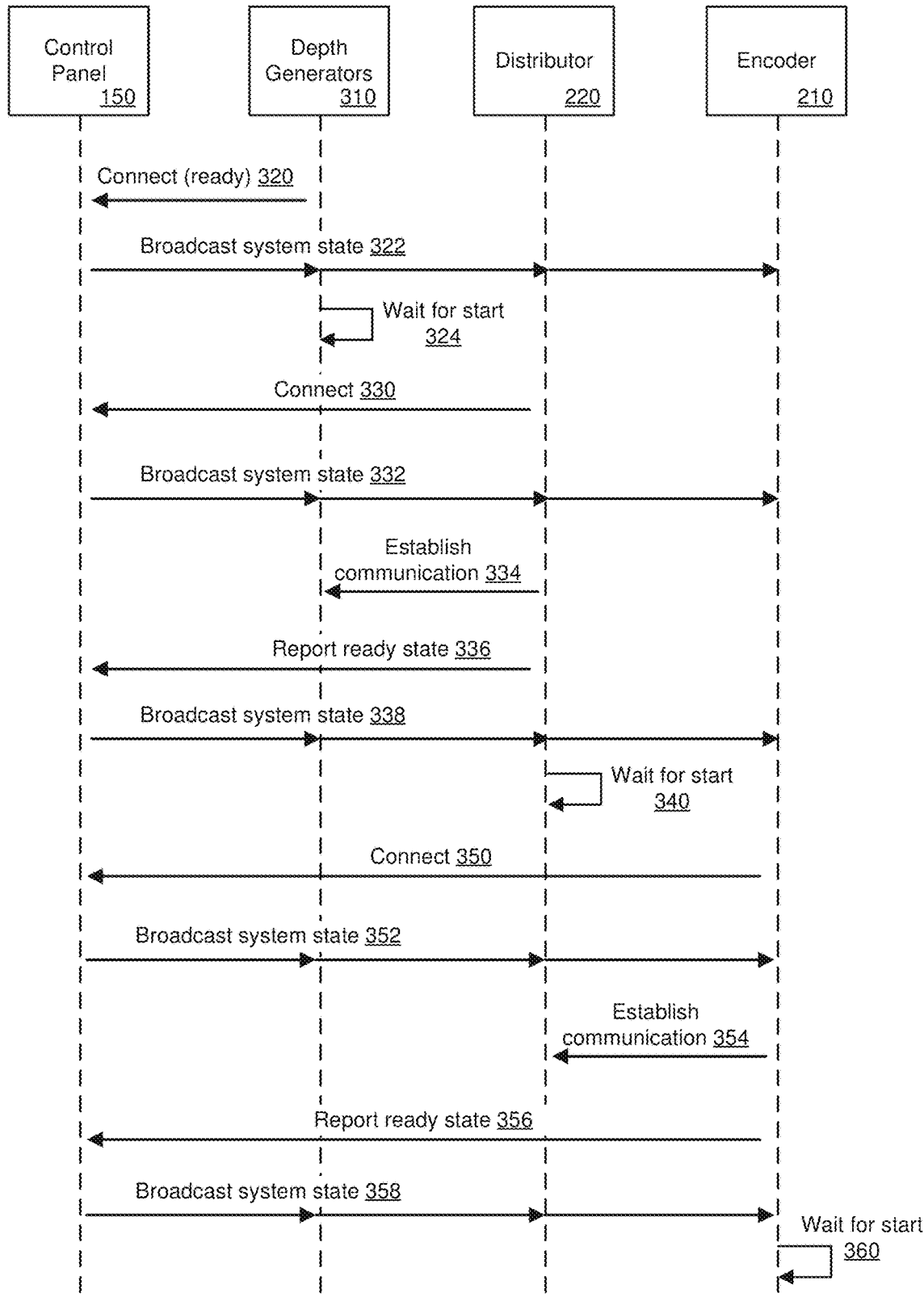
FIG. 3 is a diagram depicting an example network communication flow between a control panel and other components during a transition to a ready state.

FIG. 3 is a diagram depicting an example network communication flow 300 between a control panel 150 and other components during a transition to a ready state. Specifically, the diagram depicts network communications that occur between the control panel 150, the depth generators (e.g., collectively representing depth generator 120-123), the distributor 220, and the encoder 210.

At 320, the depth generators 310 connect to the control panel 150. For example, the depth generator 310 can send connection messages to a known network address of the control panel 150 via a network (e.g., via a local area network or a wide area network, such as the Internet) or inter-process communication. The connection messages indicate that the depth generators 310 are in a ready state. In response to the connection messages, the control panel 150 broadcasts system state messages, as depicted at 322. The system state messages indicate that the depth generators 310 are in a ready state. The system state messages can also contain additional information, such as network addresses for the depth generators 310 (e.g., IP addresses, host names, or sockets). After the depth generators 310 are connected to the control panel 150 and in a ready state, they wait for the start command, as depicted at 324. For simplicity, only a single message flow is depicted for the depth generators 310 collectively. However, there would typically be individual communications taking place with each of the depth generators, and they could occur in any order. For example, the messages depicted at 320, 322, and 324 could occur N times where N is the number of depth generators present in the overall system.

At 330, the distributor 220 connects to the control panel 150. Due to the connection of the distributor 220, the control panel 150 broadcasts a system state message, as depicted at 322 (e.g., the system state message can contain the network address of the distributor 220, network addresses of the depth generators 310, as well as state information for all components). After receiving the broadcast system state message (depicted at 322), the distributor 220 establishes direct network connections with each of the depth generators 310, as depicted at 334. For example, the distributor 220 uses the network addresses for the depth generators 310 that it received in the broadcast system state message (depicted at 322). After establishing the direct network connections, the distributor 220 enters the ready state and sends a message to the control panel 150 reporting that it is in the ready state, as depicted at 336. In response to the state change, the control panel 150 once again broadcasts a system state message, as depicted at 338. After the distributor component 220 enters the ready state, it waits for the start command, as depicted at 340.

At 350, the encoder 210 connects to the control panel 150. Due to the connection of the encoder 210, the control panel 150 broadcasts a system state message, as depicted at 352 (e.g., the system state message can contain the network address for the encoder 210, the network address of the distributor 220, network addresses of the depth generators 310, as well as state information for all components). After receiving the broadcast system state message (depicted at 352), the encoder 210 establishes a direct network connection with the distributor 220, as depicted at 354. For example, the encoder 210 uses the network addresses for the distributor 220 that it received in the broadcast system state message (depicted at 352). After establishing the direct network connection, the encoder 210 enters the ready state and sends a message to the control panel 150 reporting that it is in the ready state, as depicted at 356. In response to the state change, the control panel 150 once again broadcasts a system state message, as depicted at 358. After the encoder 210 enters the ready state, it waits for the start command, as depicted at 360.

The example network communication flow 300 depicts one example sequence of messages and events that result in the components transitioning to the ready state and waiting for a start command from the control panel 150 to begin processing. However, some of the operations and events can occur in a different order. For example, the order of 322 and 324 could be swapped. In addition, the connection messages 320, 330, and 350 could occur in any order. However, there are some dependencies in the example network communication flow 300. For example, the distributor 220 cannot establish communication with the depth generators 310 until the distributor 220 receives the broadcast system state message 322 containing the network addresses of the depth generators 310. Similarly, the encoder 210 cannot establish communication with the distributor 220 until the encoder 210 receives the broadcast system state message 352 containing the network address of the distributor 220.

Figure 4:
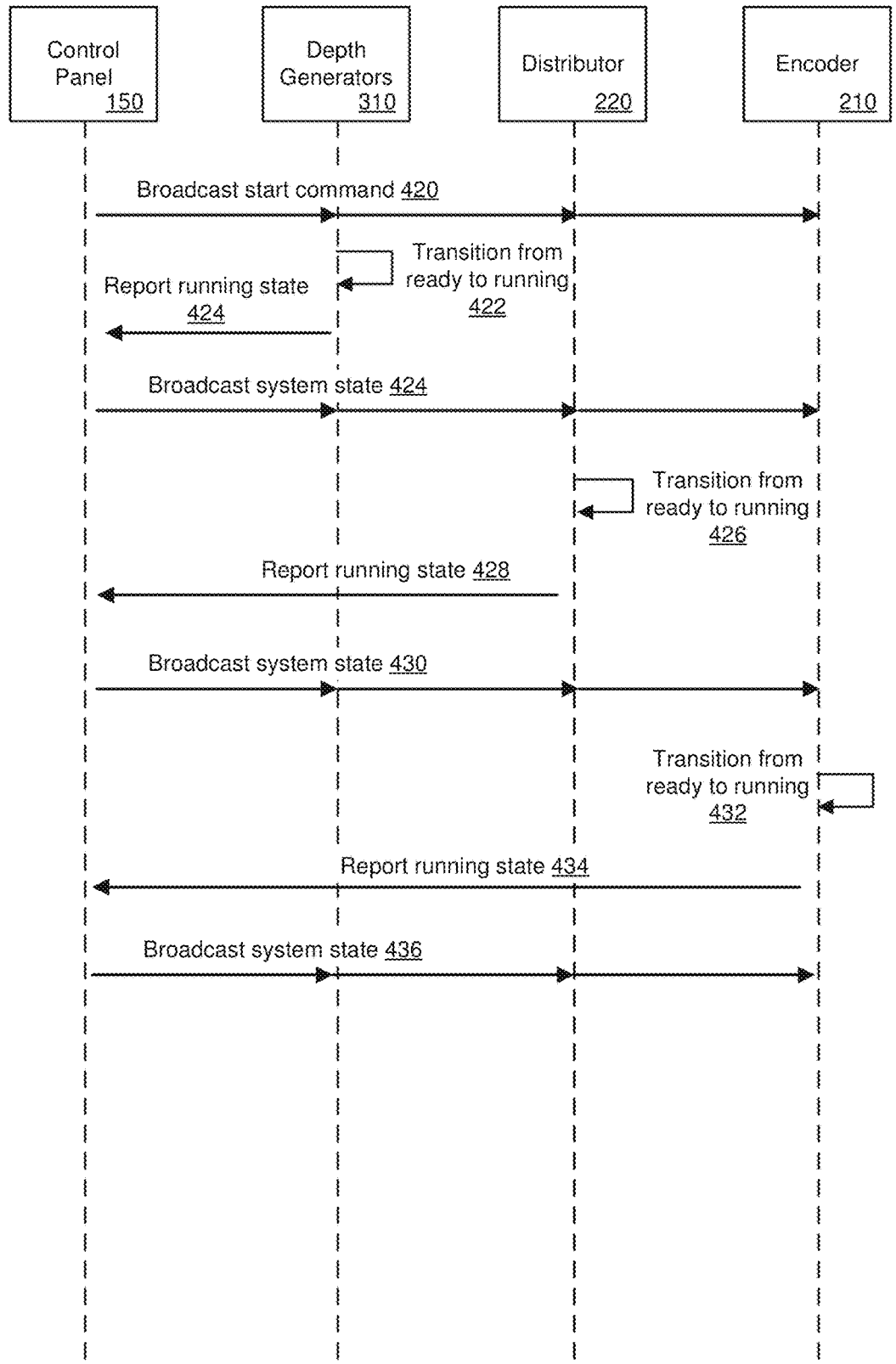
FIG. 4 is a diagram depicting an example network communication flow between a control panel and other components during a transition to a running state.

FIG. 4 is a diagram depicting an example network communication flow 400 between the control panel 150 and other components during a transition to a running state. The example network communication flow 400 continues the example network communication flow 300.

The example network communication flow 400 begins with a start command, depicted at 420, that is broadcast by the control panel 150 after the other components (the depth generators 310, the distributor 220, and the encoder 210 in this example) have transitioned to the ready state. After receiving the start command, the depth generators 310 transition from the ready state to the running state, as depicted at 422, and report the running state to the control panel 150, as depicted at 424.

The distributor 220 does not start running until after the depth generators 310 are running. Therefore, the distributor 220 waits until it receives the broadcast system state message 424 (indicating that the depth generators 310 are in the running state) before transitioning from the ready state to the running state, as depicted at 426. The distributor reports that it is in the running state, as depicted at 428.

The encoder 210 does not start running until after the distributor 220 is running. Therefore, the encoder 210 waits until it receives the broadcast system state message 430 (indicating that the distributor 220 is in the running state) before transitioning from the ready state to the running state, as depicted at 432. The encoder reports that it is in the running state, as depicted at 434. Due to the state change, the system state is broadcast, as depicted at 436.

In some implementations, the fusion component 130 and the renderers 140 can start and begin processing in any order (e.g., they are not dependent on other components to being processing operations). However, in some implementations, the fusion component 130 and the renderers 140 are dependent on other components, and they can be involved in the example network communication flows 300 and 400.

In some implementations, the controller monitors and adjusts the rate at which the various components are processing the video date (e.g., performs rate control operations). For example, the controller can receive rate information from the various components (e.g., FPS information in FPS state update messages received from the components). The controller can transmit the current FPS information to the components (e.g., in a broadcast system state message). The components can use this information to adjust their processing rate. For example, if a component is running too fast (e.g., if the encoder is transmitting encoded images at a rate too fast for the depth generators to handle, which can overload the buffers of the depth generators), then the component can adjust its rate down (e.g., the encoder can adjust its rate to match the FPS of the depth generators).

Methods for Controlling 3D Video Capture

In any of the examples herein, methods can be provided for controlling 3D video capture. The methods can be performed by a controller (e.g., by control panel component 150) in order to manage the order in which the various components start and begin processing video data.

Figure 5:
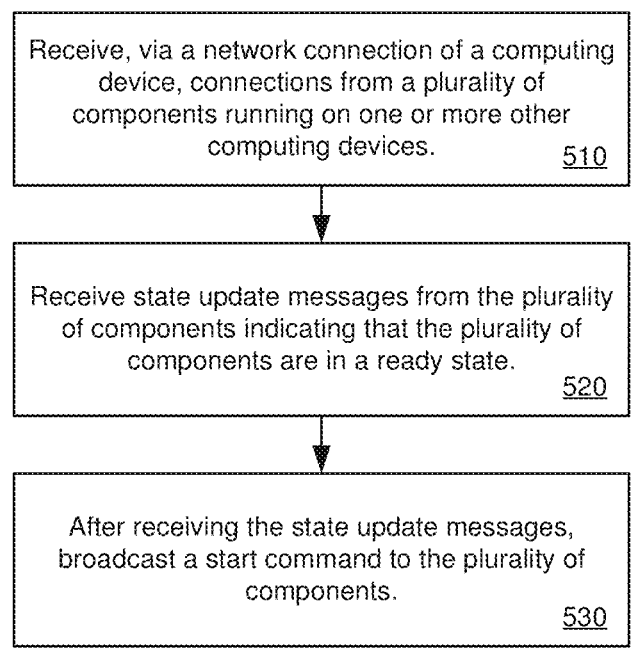
FIG. 5 is a flowchart of an example method for controlling 3D video capture.

FIG. 5 is a flowchart of an example method 500 for controlling 3D video capture. For example, the example method 500 can be performed by a controller (e.g., by control panel component 150).

At 510, connections from a plurality of components are received via a network or inter-process connection of a computing device. The plurality of components are running on one or more other computing devices (e.g., reachable via one or more wired and/or wireless networks). The plurality of components process information for generating a three-dimensional holographic video output from a captured real-world video input. The plurality of components can comprise an encoder, a distributor, depth generators, a fusion component, and/or renderers. In some implementations, the components are software applications running on the other computing devices.

At 520, state update messages are received from the plurality of components indicting that the plurality of components are in a ready state. In some implementations, the order in which the plurality of components start up and enter the ready state is controlled by system state messages that are broadcast to the plurality of components.

At 530, after receiving the state update messages from the plurality of components, a start command is broadcast to the plurality of components. For example, the plurality of components can start processing information for generating the three-dimensional holographic video output from the captured real-world video input based, at least in part, on the start command received from the computing device.

Figure 6:
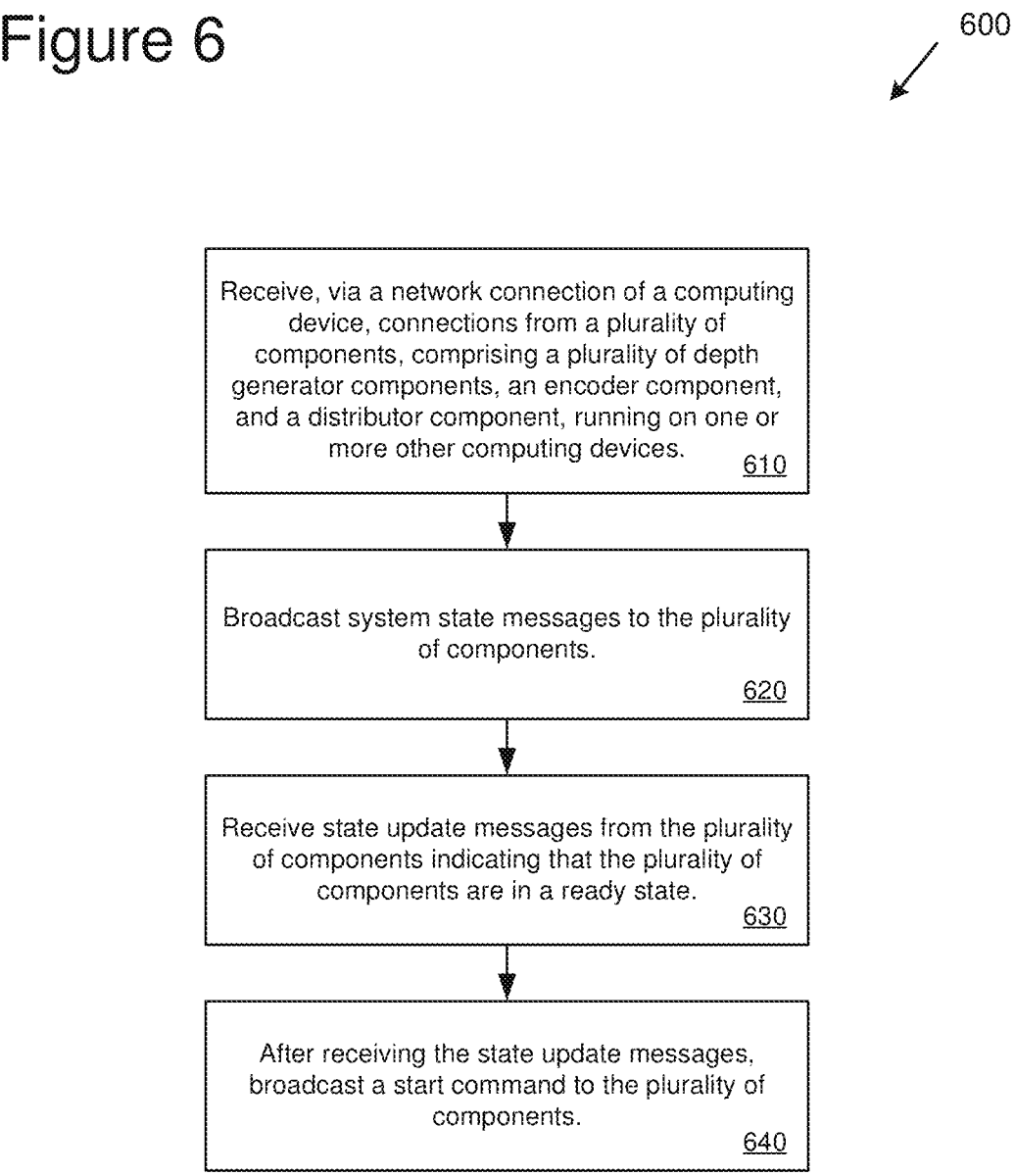
FIG. 6 is a flowchart of an example method for controlling 3D video capture that is performed by a plurality of components comprising a plurality of depth generators, an encoder, and a distributor.

FIG. 6 is a flowchart of an example method 600 for controlling 3D video capture. For example, the example method 600 can be performed by a controller (e.g., by control panel component 150).

At 610, connections from a plurality of components are received via a network or inter-process connection of a computing device. The plurality of components are running on one or more other computing devices (e.g., reachable via one or more wired and/or wireless networks). The plurality of components process information for generating a three-dimensional holographic video output from a captured real-world video input. The plurality of components comprise a plurality of depth generators, an encoder, and a distributor. In some implementations, the plurality of components also comprise a fusion component and a renderer. In some implementations, the components are software applications running on the other computing devices.

At 620, system state messages are broadcast to the plurality of components. The system state messages comprise current state information of the plurality of components and are broadcast in response to state changes among the plurality of components. The system state messages can also contain other information, such as network addresses for some or all of the plurality of components that are used for direct network connections among the plurality of components. In some implementations, the order in which the plurality of components start up and enter the ready state is controlled by the system state messages. For example, the plurality of components can use the broadcast system state messages to determine when they can change state, establish direct connections to other components, etc.

At 630, state update messages are received from the plurality of components indicating that the plurality of components are in a ready state.

At 640, after receiving the state update messages from the plurality of components, a start command is broadcast to the plurality of components. For example, the plurality of components can start processing information for generating the three-dimensional holographic video output from the captured real-world video input based, at least in part, on the start command received from the computing device.

Figure 7:
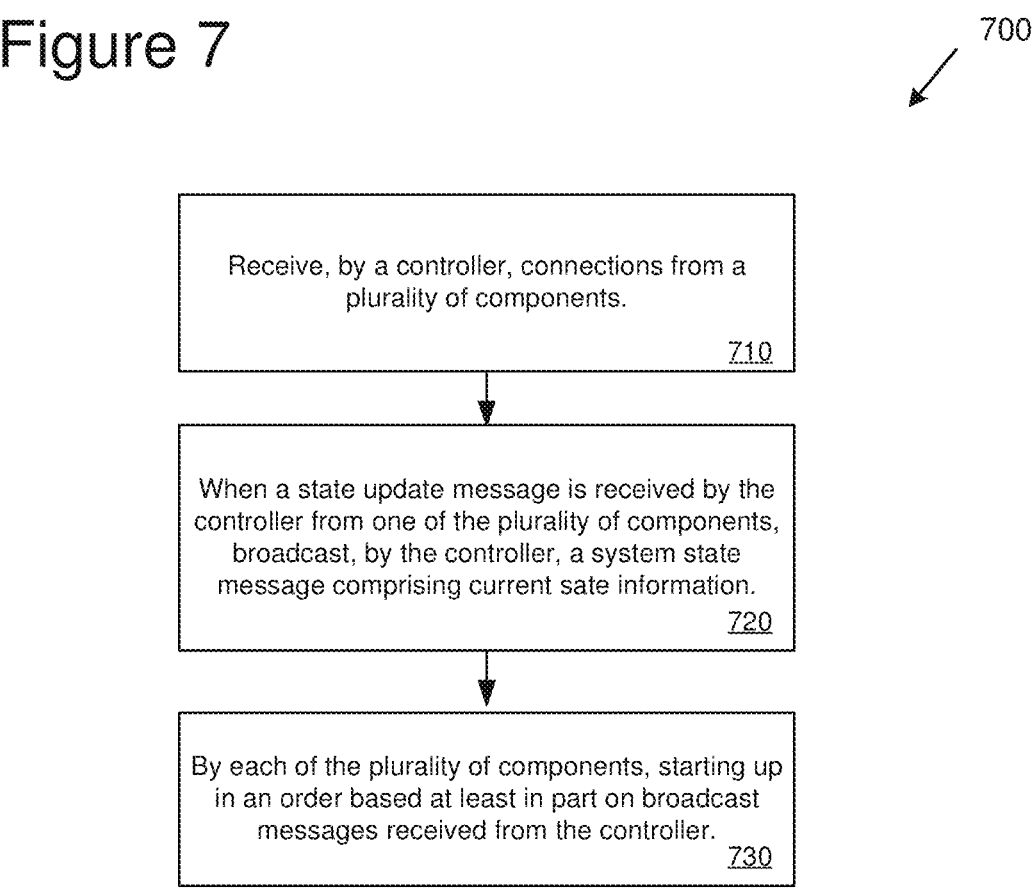
FIG. 7 is a flowchart of an example method for controlling 3D video capture by a controller.

FIG. 7 is a flowchart of an example method 700 for controlling 3D video capture by a controller. For example, the example method 700 can be performed by control panel component 150.

At 710, connections from a plurality of components are received by a controller running on a computing device (e.g., a server or a virtual machine). The plurality of components are running on one or more other computing devices (e.g., reachable via one or more wired and/or wireless networks). The plurality of components process information for generating a three-dimensional holographic video output from a captured real-world video input. The plurality of components comprise a plurality of depth generators, an encoder, and a distributor. In some implementations, the plurality of components also comprise a fusion component and a renderer. In some implementations, the components are software applications running on the other computing devices.

At 720, when a state update message is received by the control component from one of the plurality of components, the controller broadcasts a system state message comprising current state information of the plurality of components. The system state messages can also contain other information, such as network addresses for some or all of the plurality of components that are used for direct network connections among the plurality of components. In some implementations, the order in which the plurality of components start up and enter the ready state is controlled by the system state messages. For example, the plurality of components can use the broadcast system state messages to determine when they can change state, establish direct connections to other components, etc.

At 730, each of the plurality of components starts up (e.g., enters the read state and/or the running state) in an order that is based at least in part on the broadcast messages received from the controller.

Computing Systems

Figure 8:
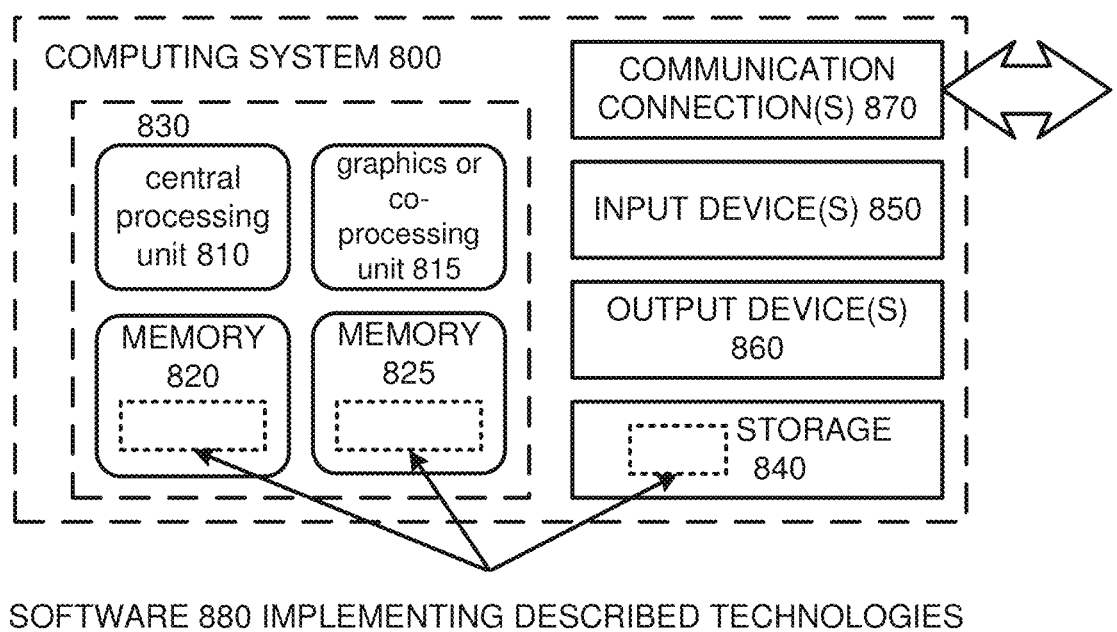
FIG. 8 is a diagram of an example computing system in which some described embodiments can be implemented.

FIG. 8 depicts a generalized example of a suitable computing system 800 in which the described technologies may be implemented. The computing system 800 is not intended to suggest any limitation as to scope of use or functionality, as the technologies may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more technologies described herein, in the form of computer-executable instructions suitable for execution by the processing unit(s), and data created by the 3D video pipeline.

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions and data for the software 880 implementing one or more technologies described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a hard disk, CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 9:
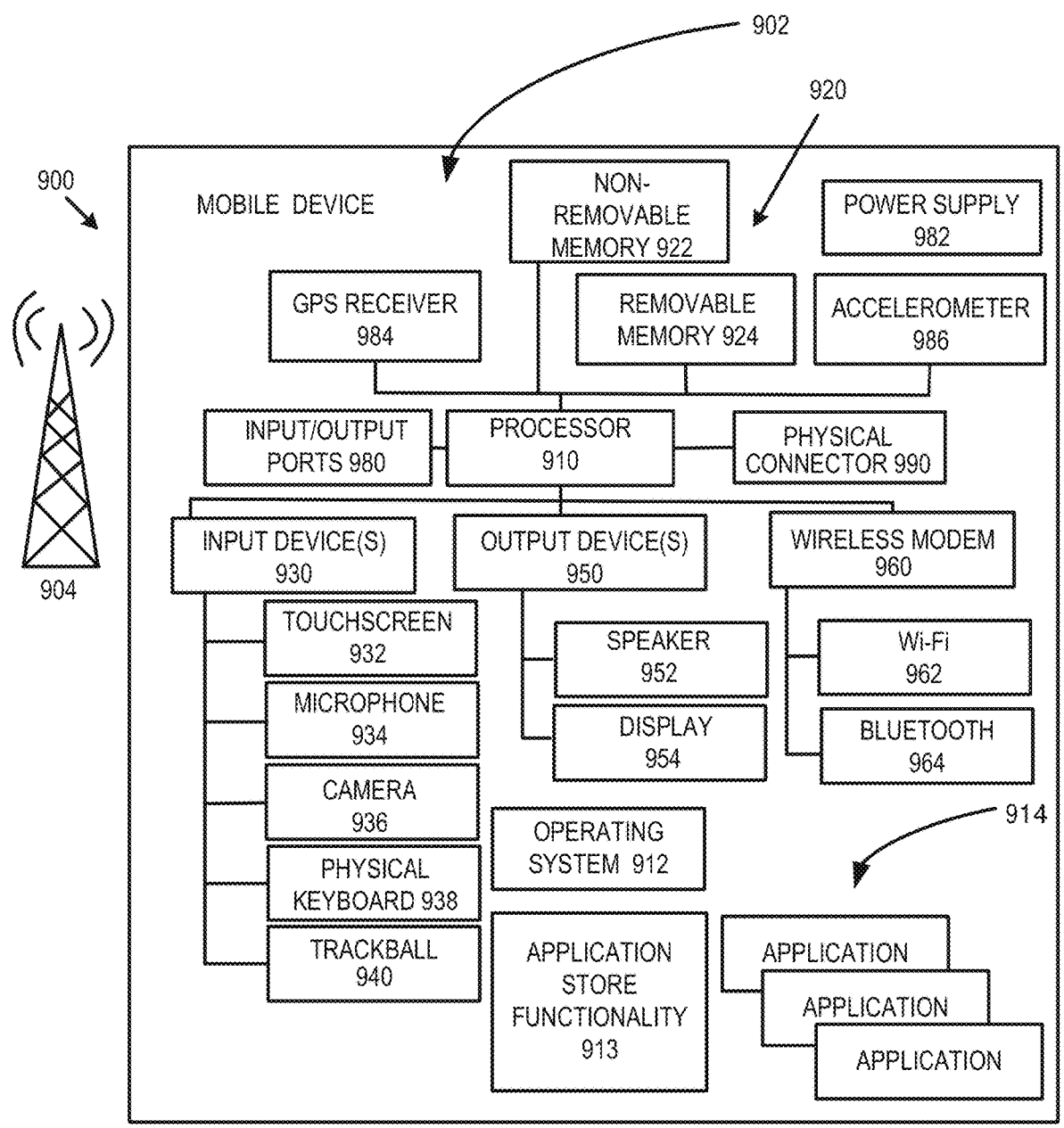
FIG. 9 is an example mobile device that can be used in conjunction with the technologies described herein.

FIG. 9 is a system diagram depicting an example mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular, satellite, or other network.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs can include common mobile computing applications (e.g., email applications, calendars, contact managers, web browsers, messaging applications), or any other computing application. Functionality 913 for accessing an application store can also be used for acquiring and updating application programs 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can be combined in a single input/output device.

The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

Cloud-Supported Environment

Figure 10:
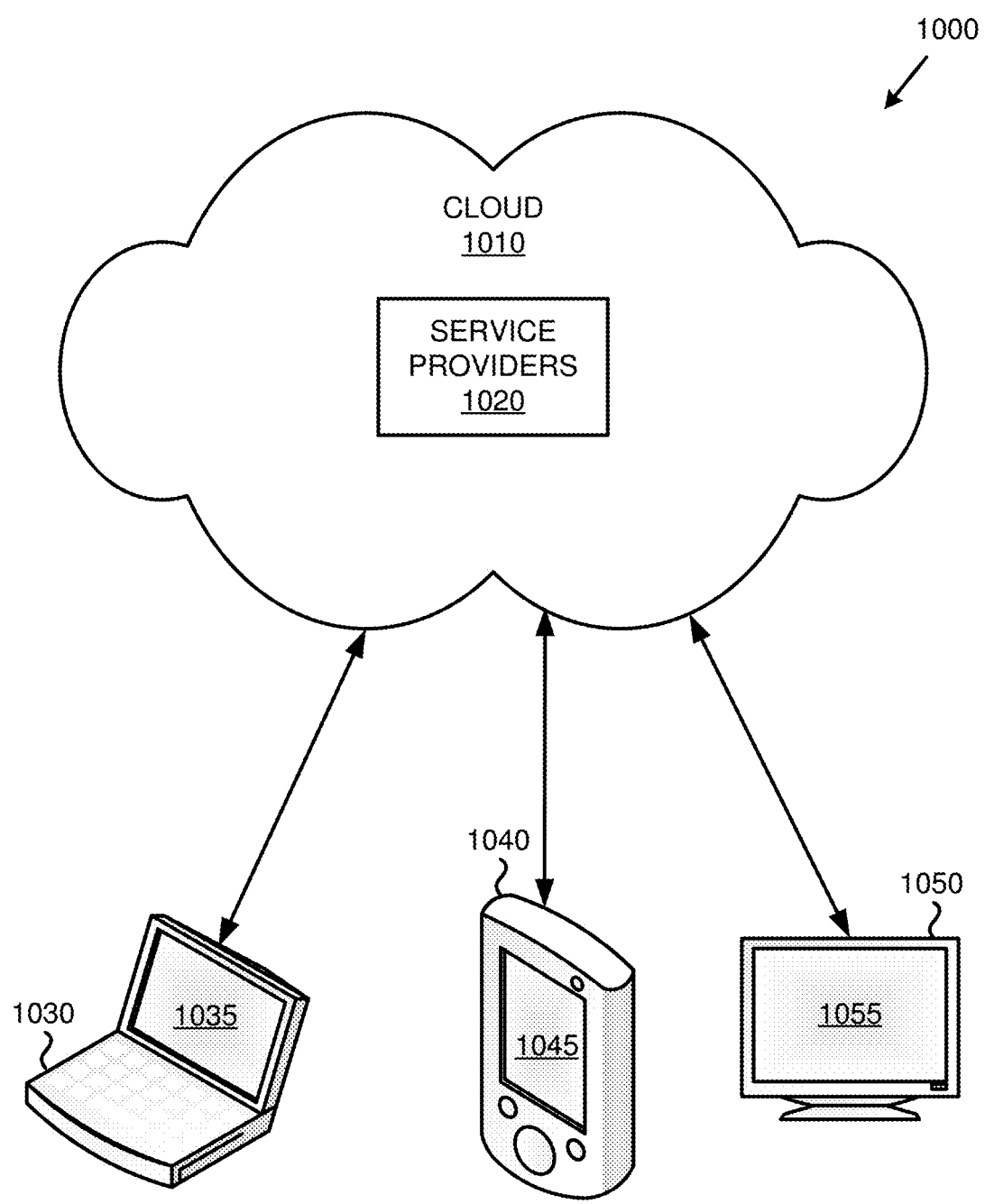
FIG. 10 is an example cloud-support environment that can be used in conjunction with the technologies described herein.

FIG. 10 illustrates a generalized example of a suitable cloud-supported environment 1000 in which described embodiments, techniques, and technologies may be implemented. In the example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050) while other tasks (e.g., storage of data to be used in subsequent processing) can be performed in the cloud 1010.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touchscreen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 8, computer-readable storage media include memory 820 and 825, and storage 840. By way of example and with reference to FIG. 9, computer-readable storage media include memory and storage 920, 922, and 924. The term computer-readable storage media does not include signals and carrier waves. In addition, the term computer-readable storage media does not include communication connections, such as 870, 960, 962, and 964.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
   a processing unit;
   memory; and
   a network connection;
   the computing device programmed, via computer-executable instructions, to implement a controller that performs operations for controlling three-dimensional (3D) video capture, the operations comprising:
      receiving, via the network connection, connections from a plurality of components, wherein the plurality of components process information for generating a three-dimensional holographic video output from a captured real-world video input, wherein the plurality of components run on a plurality of other computing devices, and wherein the plurality of other computing devices are separate from the computing device and communicate with the computing device via the network connection, and wherein the plurality of components comprise:
         a plurality of depth generators;
         an encoder, wherein the encoder transmits encoded video images from a plurality of video cameras to a distributor; and
         the distributor, wherein the distributor distributes image data from the encoded video images to the plurality of depth generators;
      receiving, via the network connection, state update messages from the plurality of components, wherein the state update messages comprise indications that the plurality of components are in a ready state; and
      after receiving the state update messages from the plurality of components, broadcasting, via the network connection, a start command to the plurality of components;
      wherein the plurality of components start processing information for generating the three-dimensional holographic video output from the captured real-world video input based, at least in part, on the start command received from the computing device.

2. The computing device of claim 1 wherein the distributor component operates in a remote network from the encoder component.

3. The computing device of claim 1 wherein the distributor component establishes direct network connections with the plurality of depth generator components before sending the state update message reporting the ready state to the computing device.

4. The computing device of claim 1 wherein the encoder component establishes a direct network connection with the distributor component before sending the state update message reporting the ready state to the computing device.

5. The computing device of claim 1 the operations further comprising:
when a state update message is received from a component of the plurality of components, broadcasting current system state to the plurality of components, wherein the current system state comprises state information for the plurality of components.

6. The computing device of claim 1 wherein the plurality of components are connected via one or more local area networks or wide area networks, and wherein the plurality of components run on a corresponding plurality of different computing devices.

7. The computing device of claim 1 wherein the plurality of components comprise:
a fusion component; and
a renderer component.

8. A method, implemented by a computing device comprising a processing unit and memory, the method comprising:
by a controller running on the computing device:
receiving, via a network connection, connections from a plurality of components, wherein the plurality of components process information for generating a three-dimensional holographic video output from a captured real-world video input, wherein the plurality of components run on a plurality of other computing devices, wherein the plurality of other computing devices are separate from the computing device and communicate with the computing device via the network connection, and wherein the plurality of components comprise:
a plurality of depth generators;
an encoder, wherein the encoder transmits encoded video images from a plurality of video cameras to a distributor; and
the distributor, wherein the distributor distributes image data from the encoded video images to the plurality of depth generators;
broadcasting, via the network connection, system state messages to the plurality of components, wherein the system state messages comprise current state information for the plurality of components, and wherein the system state messages are broadcast in response to state changes among the plurality of components;
receiving, via the network connection, state update messages from the plurality of components, wherein the state update messages comprise indications that the plurality of components are in a ready state;
after receiving the state update messages from the plurality of components, broadcasting, via the network connection, a start command to the plurality of components;
wherein the plurality of components start processing information for generating the three-dimensional holographic video output from the captured real-world video input according to a startup order that is based, at least in part, on the broadcast system state messages.

9. The method of claim 8 wherein the broadcast system state messages comprise network connection information for the plurality of components, and wherein the plurality of components use the network connection information to establish direct network connections among the plurality of components.

10. The method of claim 8 wherein the real-world video input is captured by the plurality of video cameras that capture video images and transmit the captured video images to the encoder.

11. The method of claim 10 wherein the distributor operates in a remote network from the encoder.

12. The method of claim 10 wherein the encoder performs operations comprising:
receiving the video images from the plurality of video cameras;
encoding the video images using a video codec to generate the encoded video images; and
transmitting the encoded video images to the distributor via a wireless network connection;
wherein the distributor is in a remote geographical environment from the encoder.

13. The method of claim 8 wherein the distributor establishes a direct network connection with the plurality of depth generators before sending the state update message reporting the ready state, and wherein the encoder establishes a direct network connection with the distributor before sending the state update message reporting the ready state.

14. The method of claim 8 wherein the plurality of depth generators start processing in response to receiving the start command, wherein the distributor starts processing in response to receiving a broadcast system state message indicating a state change of the depth generators to a running state, and wherein the encoder starts processing in response to receiving a broadcast system state message indicating a state change of the distributor to a running state.

15. A method, implemented by a plurality of computing devices comprising processing units and memory, the method comprising:
by a controller running on a first computing device:
receiving, via a network connection, connections from a plurality of components, wherein the plurality of components process information for generating a three-dimensional holographic video output from a captured real-world video input, and wherein the plurality of components comprise:
an encoder, wherein the encoder transmits encoded video images from a plurality of video cameras to a distributor;
the distributor, wherein the distributor distributes image data from the encoded video images to a plurality of depth generators; and
the plurality of depth generators;
when a state update message is received from a component, broadcasting a system state message to the plurality of components, wherein the system state message comprises current state information of the plurality of components;
by each of the plurality of depth generators, the distributor, and the encoder, running on a plurality of other computing devices:
starting up in an order based at least in part on broadcast messages received from the controller;

wherein the plurality of other computing devices are separate from the first computing device and communicate with the first computing device via the network connection.

16. The method of claim 15 wherein starting up in the order comprises:
by the plurality of depth generators:
connecting to the controller at a known network address and reporting a ready state;
receiving a broadcast start command from the controller; and
in response to the start command, transitioning from the ready state to a running state.

17. The method of claim 15 wherein starting up in the order comprises:
by the distributor:
connecting to the controller at a known network address;
in response to a first broadcast system state message from the controller indicating network addresses for the plurality of depth generators, establishing direct network connections to the plurality of depth generators; and
in response to a second broadcast system state message from the controller indicating that the depth generators are in a running state, transitioning from a ready state to a running state.

18. The method of claim 15 wherein starting up in the order comprises:
by the encoder component:
connecting to the controller at a known network address;
in response to a first broadcast system state message from the controller indicating a network address for the distributor, establishing a direct network connection to the distributor; and
in response to a second broadcast system state message from the controller indicating that the distributor is in a running state, transitioning from a ready state to a running state.

* * * * *